United States Patent
Labenski et al.

(10) Patent No.: US 9,952,779 B2
(45) Date of Patent: Apr. 24, 2018

(54) PARALLEL SCHEDULING OF WRITE COMMANDS TO MULTIPLE MEMORY DEVICES

(71) Applicant: Apple Inc., Cupertino, CA (US)

(72) Inventors: Yoni Labenski, Tel Aviv (IL); Roman Gindin, Hod Hasharon (IL); Etai Zaltsman, Ramat Hasharon (IL); Moti Altahan, Kiryat Ono (IL); Yoram Harel, Yokneam (IL); Barak Baum, Givatayim (IL)

(73) Assignee: APPLE INC., Cupertino, CA (US)

( * ) Notice: Subject to any disclaimer, the term of this patent is extended or adjusted under 35 U.S.C. 154(b) by 144 days.

(21) Appl. No.: 15/057,145

(22) Filed: Mar. 1, 2016

(65) Prior Publication Data

US 2017/0255396 A1    Sep. 7, 2017

(51) Int. Cl.
  *G06F 12/00*    (2006.01)
  *G06F 3/06*    (2006.01)
(52) U.S. Cl.
  CPC .......... *G06F 3/0613* (2013.01); *G06F 3/0647* (2013.01); *G06F 3/0683* (2013.01)
(58) Field of Classification Search
  CPC ..... G06F 3/0613; G06F 3/0647; G06F 3/0683
  See application file for complete search history.

(56) References Cited

U.S. PATENT DOCUMENTS

| | | | |
|---|---|---|---|
| 7,099,989 B2 * | 8/2006 | Morzano | G06F 13/4239 345/534 |
| 7,243,185 B2 | 7/2007 | See et al. | |
| 8,397,018 B2 | 3/2013 | Dhakshinamurthy et al. | |
| 8,441,869 B2 | 5/2013 | Kim | |
| 9,153,324 B2 | 10/2015 | Parker et al. | |
| 2011/0035538 A1 | 2/2011 | Kim et al. | |
| 2012/0005415 A1 | 1/2012 | Jung et al. | |
| 2012/0001545 A1 | 2/2012 | Dhakshinamurthy et al. | |
| 2014/0223084 A1 | 8/2014 | Lee et al. | |
| 2015/0154108 A1 | 6/2015 | Gorobets et al. | |
| 2015/0179269 A1 | 6/2015 | Lee | |
| 2015/0193299 A1 | 7/2015 | Hyun et al. | |

FOREIGN PATENT DOCUMENTS

WO    2012015457 A1    2/2012

* cited by examiner

*Primary Examiner* — Matthew Bradley
(74) *Attorney, Agent, or Firm* — D. Kligler IP Services, Ltd.

(57) ABSTRACT

A controller includes an interface and a processor. The interface is configured to communicate with multiple memory devices over a link. The processor is configured to select at least first and second memory devices for writing, and to write at least first and second data units in sequence to the first memory device over the link, while avoiding writing to any of the other memory devices until transferal of the at least first and second data units over the link has been completed, to write at least one data unit to the second memory device after transferring the at least first and second data units to the first memory device, and, in response to verifying that the first memory device is ready to receive subsequent data, to write to the first memory device at least a third data unit.

18 Claims, 4 Drawing Sheets

PARALLEL SCHEDULING OF WRITE COMMANDS TO MULTIPLE MEMORY DEVICES

TECHNICAL FIELD

Embodiments described herein relate generally to data storage, and particularly to methods and systems for improving write throughput to multiple memory devices.

BACKGROUND

Various storage systems comprise multiple memory devices that connect to a controller via some bus interface or link. The write throughput of the system, i.e., the amount of data that can be stored during a unit of time, is a critical performance measure of the storage system. Write throughput can be measured, for example, in Mbytes per second.

Methods for scheduling write commands to multiple memory devices are known in the art. For example, U.S. Pat. No. 8,441,869, whose disclosure is incorporated herein by reference, describes data storage systems including a plurality of memories and a control circuit coupled to the plurality of memories by a common channel. The control circuit is configured to sequentially transfer respective units of data to respective memories within each of a plurality of predetermined groups of the plurality of memories over the common channel and to transition from transferring units of data to a first one of the groups to transferring units of data to a second one of the groups based on an attribute of the units of data. The attribute may be related to a programming time associated with a unit of data. For example, the attribute may include a bit-significance of the unit of data.

U.S. Pat. No. 9,153,324, whose disclosure is incorporated herein by references, describes a die assignment scheme that assigns data, in the order it is received, to multiple memory dies with some randomness. Randomization events, such as skipping dies or reversing direction, occur at intervals, with a deterministic assignment scheme used between randomization events. Intervals between randomization events may be of random length, or of fixed length.

SUMMARY

An embodiment that is described herein provides a controller that includes an interface and a processor. The interface is configured to communicate with multiple memory devices over a link. The processor is configured to select at least first and second memory devices for writing, and to write at least first and second data units in sequence to the first memory device over the link, while avoiding writing to any of the other memory devices until transferal of the at least first and second data units over the link has been completed, to write at least one data unit to the second memory device after transferring the at least first and second data units to the first memory device, and, in response to verifying that the first memory device is ready to receive subsequent data, to write to the first memory device at least a third data unit.

In some embodiments, the processor is configured to verify that the first memory device is ready to accept data after completing transferring the first data unit over the link and before transferring the second data unit over the link. In other embodiments, the processor is configured to write each of the first, second and third data units to a same block within the first memory device.

In an embodiment, the first and second data units include respective data pages that differ in bit-significance. In another embodiment, the processor is configured to select the at least first and second memory devices in accordance with a predefined cyclic order.

There is additionally provided, in accordance with an embodiment that is described herein, a method including, in a controller that connects to multiple memory devices via a link, selecting at least first and second memory devices for writing, and writing at least first and second data units in sequence to the first memory device over the link, while avoiding writing to any of the other memory devices until transferal of the at least first and second data units over the link has been completed. After transferring the at least first and second data units to the first memory device, at least one data unit is written to the second memory device. In response to verifying that the first memory device is ready to receive subsequent data, at least a third data unit is written to the first memory device.

There is additionally provided, in accordance with an embodiment that is described herein, a controller that includes an interface and a processor. The interface is configured to communicate with multiple memory devices over a link. The a processor is configured to identify one or more of the memory devices that are ready to receive data, to select a memory device from among the identified memory devices, and, even though the selected memory device is ready to receive data, to generate a random delay and to write a data unit to the selected memory device over the link only after waiting the random delay during which the memory controller does not write to any of the memory devices.

In some embodiments, the processor is configured to write data units of different bit-significance in consecutive write commands to the same memory device. In other embodiments, the processor is configured to change a selection order among the memory devices by waiting the random delay. In yet other embodiments, the processor is configured to generate a random value using a pseudo-random number generator, and to wait a time delay based on the random value.

There is additionally provided, in accordance with an embodiment that is described herein a method including, in a memory controller that connects to multiple memory devices via a link, identifying one or more of the memory devices that are ready to receive data, and selecting a memory device from among the identified memory devices. Even though the selected memory device is ready to receive data, a random delay is generated, and a data unit is written to the selected memory device over the link only after waiting the random delay during which the memory controller does not write to any of the memory devices.

These and other embodiments will be more fully understood from the following detailed description of the embodiments thereof, taken together with the drawings in which:

DETAILED DESCRIPTION OF EMBODIMENTS

Overview

Figure 1:
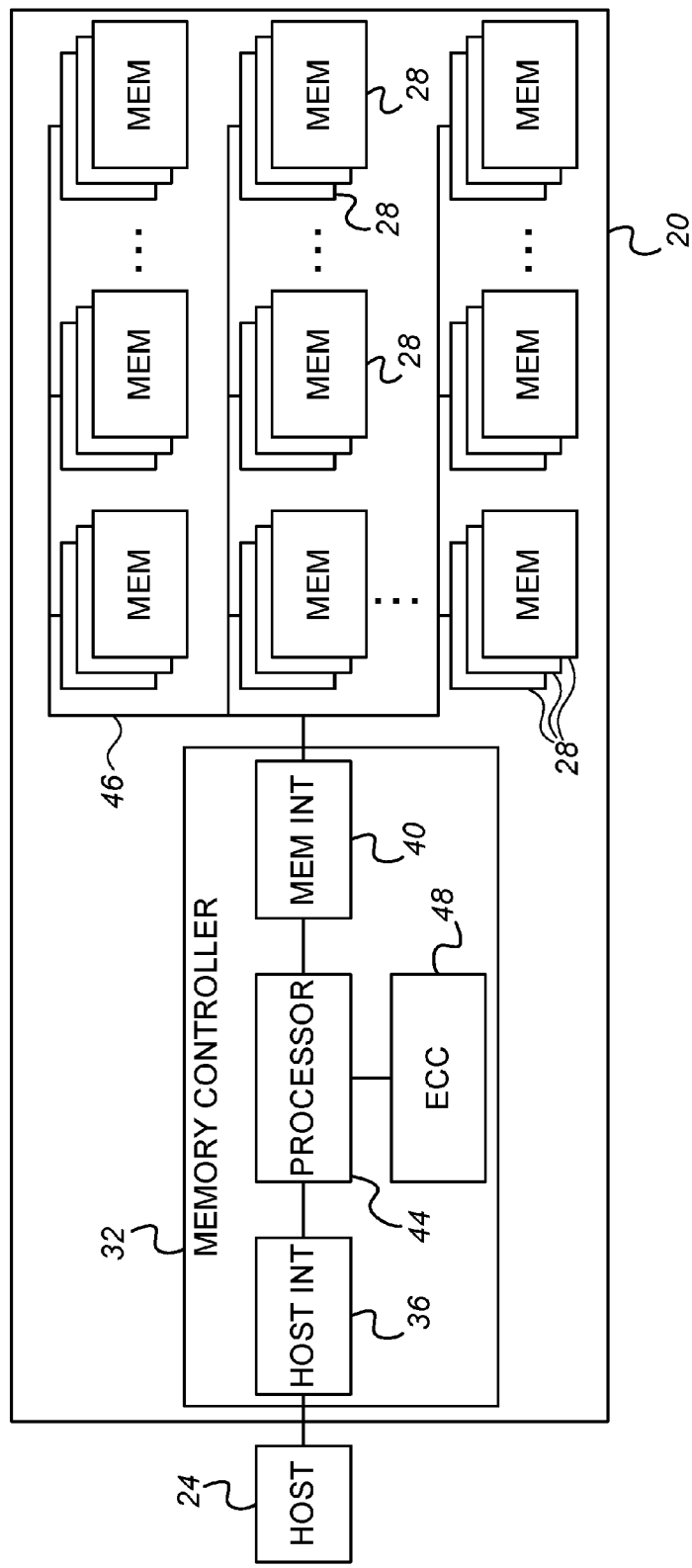
FIG. 1 is a block diagram that schematically illustrates a multi-device memory system, in accordance with an embodiment that is described herein.

Storage systems typically comprise a controller that stores data in multiple memory devices. The controller typically communicates with the memory devices over a bus that supports communicating with only one memory device at a time. The memory devices comprise memory cells that store data by setting the memory cells to assume respective programming levels.

Each of the memory devices is typically configured to store and retrieve data in units that are referred to as data pages, or simply pages for brevity. For example, in a multi-level cell (MLC) device that stores 2 bits/cell, the controller first stores a least significant bit (LSB) page to a given group of memory cells (e.g., a word line, or part thereof) and later stores a most significant bit (MSB) page to the same group of cells.

During the programming of a data page to the memory cells, the memory device holds the data page in an internal buffer or cache for a certain time period, referred to herein as "cache-busy" period. During the busy period the buffer is not allowed to be overwritten, and therefore the memory device does not accept new data for buffering. When programming the memory devices, the cache-busy periods of the memory devices typically cause communication idle periods during which the controller is not allowed to send data to any of the memory devices, and programming idle times during which the memory devices wait for receiving subsequent data from the controller. The idle periods degrade the write throughput and should therefore be as short as possible.

Embodiments that are disclosed herein provide methods and systems for increasing the write throughput of a storage system. In one disclosed technique, the controller schedules writing a pair of data pages, e.g., LSB and MSB pages, to maximize the write throughput. In another disclosed technique, the controller artificially increases the communication idle period by a random delay, which resolves inefficient write patterns.

Programming a LSB page is typically much faster than programming a MSB page (or higher bit-significance pages.) The reason for this asymmetry in programming times relates, at least in part, to using a MSB programming technique in which the memory device reads an already programmed LSB page from a group of memory cells, and combines the read page with the MSB page to program the memory cells in the group to their final levels. As a numerical example, programming LSB and MSB pages may take about 350 and 1250 micro-seconds, respectively, of which the respective cache-busy periods are 15 and 1100 micro-seconds.

To store a data page, the controller typically sends to the relevant memory device a write command that includes addressing information and the data page(s) to be stored. For example, sending a command for writing a single data page may take on the order of 50 micro-seconds. In some embodiments, the write command includes multiple data pages that the device programs simultaneously to respective planes that each comprises multiple blocks of memory cells. For example, the delivery time of a write command for storing four data pages in four respective planes is about 200 micro-seconds.

In some of the disclosed embodiments, the memory devices comprise MLC devices that store 2 bits/cell, and the controller sends to the memory devices page pairs comprising a LSB page and a MSB page. The LSB and MSB pages in such a pair are destined to the same group of memory cells or to different groups of memory cells. For example, in some embodiments, a LSB page is programmed to a given word line and a MSB page is then programmed to an adjacent word line. Alternatively, writing a LSB page to a given word line is followed by writing a MSB page to the same word line. Similar techniques apply to devices that store more than two bits per cell such as triple-level cell (TLC) devices.

In some embodiments, the controller sends a LSB page to a given memory device, waits until the given device is ready to receive subsequent data, and then sends to the same device a MSB page. Only after sending the LSB and MSB pages to the given device, the controller selects another memory device and sends to the selected device a pair of a LSB page and a MSB page. In an embodiment, the controller selects the memory devices in a predefined cyclic order.

Consider an example storage system having four memory devices that employs the writing scheme described above. Referring to the numerical example given above, the controller is allowed to send an MSB page 15 micro-seconds after concluding sending the LSB page and initiating the programming of the LSB page by sending a suitable command to the die. As a result, the memory device starts programming the MSB page immediately after programming the LSB page, i.e., at zero idle programming period. The idle programming time between the MSB page and sending the next LSB page to the same die in this example is 60 micro-seconds, as will be described in detail below.

For comparison, consider a reference writing scheme in which the controller first writes a LSB page to each of the devices and then writes a MSB page to each of the devices. Consider a performance measure that is defined as the inefficiency caused by the extra time in a programming cycle relative to the idle cycle period. The programming inefficiency of the proposed scheme is about 4%, which is significantly better than the programming inefficiency of 31% that can be achieved using the reference scheme. The periods used for evaluating the system performance are typically averaged across the dies and over time.

In some embodiments, instead of writing to the memory devices at a cyclic fixed order, the controller writes to the memory device that is first ready to receive data. When several memory devices are ready, the controller selects one of them using a suitable selection method. Note that in practical storage systems, the programming times of the LSB and MSB pages vary among different memory devices and even among different groups of memory cells within each memory device. As a result, using, for example, the reference writing scheme described above, may result in longer than necessary idle periods.

The inventors discovered, using computer simulations, that slightly extending the communication idle period or the idle programming period, assists in resolving inefficient writing patterns. In some embodiments, the controller extends the idle period by waiting a random delay after detecting that a given memory device is ready to receive data and before the controller actually starts sending the data to the given memory device. The extended idle period may cause a change to the writing order among the memory devices, which resolves problematic writing patterns and results in improved performance. The computer simulations demonstrate improvement of about 10% in the writing throughput, when writing on the order of 2000 Mbytes/Second.

System Description

FIG. 1 is a block diagram that schematically illustrates a multi-device memory system 20, in accordance with an embodiment that is described herein. System 20 accepts data for storage from a host 24 and stores it in memory, and retrieves data from memory and provides it to the host. In the present example, system comprises a Solid-State Disk (SSD) that stores data for a host computer. In alternative embodiments, however, system 20 may be used in any other suitable application and with any other suitable host, such as in computing devices, cellular phones or other communication terminals, removable memory modules, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple memory cells. In the present example, devices 28 comprise non-volatile NAND Flash devices, although any other suitable memory type, such as NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells, can also be used.

In some embodiments, the memory cells of devices 28 comprise analog memory cells that hold a continuous, analog value of a physical parameter, such as an electrical voltage or charge. Any suitable type of analog (or other types of) memory cells, such as the types listed above, can be used. In the present example, each memory device 28 comprises a non-volatile memory of NAND Flash cells. The charge levels stored in the cells and/or the analog voltages or currents written into and read out of the cells are referred to herein collectively as analog values or storage values.

A given memory device stores data in its memory cells by programming the cells to assume respective memory states, which are also referred to as programming levels. The programming levels are selected from a finite set of possible levels, and each level corresponds to a certain nominal storage value. For example, a 2 bit/cell multi-level cell (MLC) can be programmed to assume one of four possible programming levels by writing one of four possible nominal storage values into the cell.

The memory cells are typically arranged in rows and columns. Typically, a given memory device comprises multiple erasure blocks (also referred to as memory blocks), i.e., groups of memory cells that are erased together. Data typically cannot be reprogrammed in-place, and memory blocks are therefore erased before being programmed with other data.

Each memory device 28 may comprise a packaged device or an unpackaged semiconductor chip or die. A typical SSD may comprise a number of 4 GB devices. Generally, however, system 20 may comprise any suitable number of memory devices of any desired type and size.

System 20 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data.

Controller 32 communicates with memory devices 28 over a link 46. Link 46 may comprise any suitable link or bus such as a parallel bus or a serial bus. Link 46 may operate in accordance with any suitable standard or protocol, and at any suitable rate. In some embodiments, link 46 comprises multiple bus lines such as data lines for delivering commands and data information, address lines that carry addressing information, e.g., for accessing a desired group of memory cells within a memory device, and control lines such as read/write lines, lines for sensing which of the memory devices is ready to accept data, and the like.

In system 20, link 46 supports communicating with only one memory device at a time. As a result, when sending data to a given memory device, all the other memory devices to which the controller connects via link 46 are inhibited from being written. When at least one of the memory devices becomes ready to receive data, the controller may send subsequent write commands.

In system 20, the memory devices store data in predefined data units that are referred to as data pages. The memory controller typically sends data for storage to over link 46 using the same data page units. Each of memory devices 28 comprises a buffer or cache that temporarily stores the data unit accepted from controller 32. The memory device holds the data in the buffer as long as required by the device for safely programming the data to a relevant group of the memory cells. The period during which the device does not permit overwriting the buffer is referred to herein as a "cache-busy" period. In some embodiments, during the cache-busy period, the device sends an indication to controller 32 that signals to the controller that the device is not ready to receive data.

In some embodiments, controller 32 encodes the stored data with an Error Correction Code (ECC). In these embodiments, controller 32 comprises an ECC unit 48, which encodes the data before stored in devices 28 and decodes the ECC of data retrieved from devices 28. The functions of processor 44 can be implemented, for example, using software running on a suitable Central Processing Unit (CPU), using hardware (e.g., state machine or other logic), or using a combination of software and hardware elements.

Memory controller 32, and in particular processor 44, may be implemented in hardware. Alternatively, the memory controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. Elements that are not necessary for understanding the principles of the described embodiments, such as various interfaces, addressing circuits, timing and sequencing circuits and debugging circuits, have been omitted from the figure for clarity.

In the exemplary system configuration shown in FIG. 1, memory devices 28 and memory controller 32 are implemented as separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by a processor or other element of the host system, or by any other type of memory controller. In some embodiments, host 24 and Memory controller 32 may be fabricated on the same die, or on separate dies in the same device package.

Efficient Schemes for Writing to Multiple Memory Devices

Figure 2:
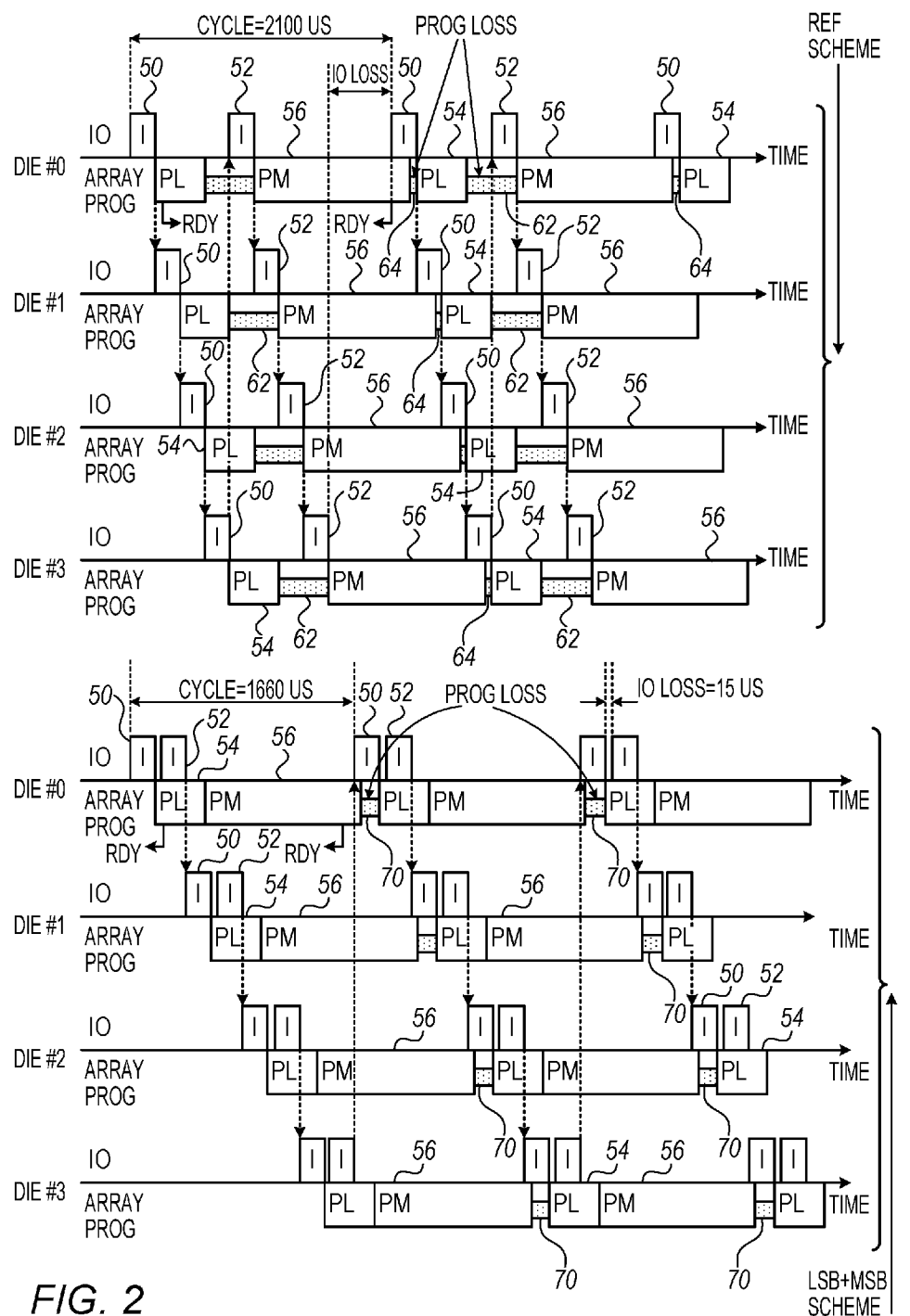
FIG. 2 is a diagram that schematically illustrates a scheduling scheme for writing data to multiple memory devices, in accordance with an embodiment that is described herein.

FIG. 2 is a diagram that schematically illustrates a scheduling scheme of writing data to multiple memory devices, in accordance with an embodiment that is described herein. The bottom of the figure shows the disclosed scheme. The top of the figure shows a naïve reference scheme, for performance comparison. The reference and disclosed writing schemes in FIG. 2 refer to a storage system such as system 20, in which controller 32 writes data to four memory devices 28 over common link 46.

In the present example we assume that each memory device is implemented in a separate die. The dies are denoted DIE #0, DIE #1, DIE #2 and DIE #3. In both writing schemes of FIG. 2, the controller writes to the memory devices in a predefined cyclic order, e.g., 0, 1, 2, 3, 0, 1, 2, 3 . . . and so on.

The diagrams of FIG. 2 depict input/output (I/O) events in which the controller sends write commands to the devices over link 46, and programming events during which a device programs data received in such a write command to its memory cells. The I/O and programming events are depicted above and below the time axis, respectively. A write command typically contains addressing information and one or more data pages. In the description that follows, for the sake of clarity, we mainly refer to the data parts of the write commands.

In the present example, I/O events 50 and 52 (both denoted "I") refer to sending a LSB page and a MSB page, respectively. In the present example, the controller writes four pages for storage in respective four planes of the device, and the I/O event duration is 200 micro-seconds in sending four LSB pages or four MSB pages. Programming events 54 (denoted "PL") and 56 (denoted "PM"), refer to programming a LSB page and a MSB page to the memory cells, respectively.

In the description that follows, for the sake of clarity, we refer to programming a LSB (or MSB) page also in embodiments in which multiple such pages are programmed simultaneously to multiple planes on the same die. For example, the PL duration represents the longest programming time among four LSB pages that are programmed simultaneously to respective planes on the same die.

Within a given memory device, programming a LSB page is typically much shorter than programming a MSB page. Moreover, in writing a LSB page, the cache-busy period is significantly shorter than in writing a MSB page. In the example of FIG. 2, the durations of the programming events PL and PM are 350 and 1250 micro-seconds, respectively. In FIG. 2, a RDY arrow indicates that the data recently held in the device's buffer is no longer required for programming, and therefore may be overwritten with subsequent data. The period between the start point of PL or PM and the respective RDY represents the cache-busy period. In the present example, the LSB and MSB cache-busy periods are 15 and 1100 micro-seconds, respectively.

The difference between the LSB and MSB programming durations and the LSB and MSB cache-busy durations relates, at least in part, to using a programming scheme in which the LSB page is written to memory cells that are in the erased state, while programming the MSB page requires reading the previously programmed LSB data from the memory cells and combining the LSB data with the MSB data to program the memory cells to their final levels or states.

In the reference scheme depicted in FIG. 2, the controller first sends an LSB page to each of the dies, and then sends a MSB page to each of the dies, in the same order. When a given die has a data page saved in its buffer, the given die starts programming this page to the relevant memory cells, and the controller starts sending a subsequent data page to the next die in order. As depicted in the diagram, eight I/O events occur contiguously, and then the controller waits until DIE #0 is ready to receive another LSB page. During this waiting period link 64 is undesirably idle.

In the present example, periods 62 and 64 denote idle programming periods during which the device waits to receive a respective subsequent MSB or LSB page. Idle programming period 62 is given by (4·200−350)=450 micro-seconds, and idle programming period 64 is given by (200−150)=50 micro-seconds. The overall idle programming period per memory device is therefore given by 450+50=500 micro-seconds.

Let a writing cycle denote the time for writing LSB and MSB pages to the four dies, i.e., the duration between two consecutive LSB I/O events 50. The writing cycle in the reference scheme includes five I/O periods of 200 micro-seconds and the MSB cache-busy period, i.e., 1000+ 1100=2100 micro-seconds. The programming efficiency for the reference scheme is thus given by (1−500/2100) or approximately 76%. Alternatively, the performance can be measured in terms of the extra duration in the programming cycle compared to the ideal period. In accordance with this performance measure, the ideal period amounts to 350+ 1250=1600 micro-seconds, and the programming inefficiency caused by the extra idle time is given by (2100/1600− 1) or about 31%.

In the writing scheme at the lower part of FIG. 2, the controller sends to each of the memory devices both a LSB and a MSB page, before sending data to any other memory device. According to this scheme, a given memory device receives a pair of LSB and MSB pages only after the controller has sent a pair of LSB page and a MSB page to each of the other memory devices. Note that since the controller delivers data to the devices in data page units, the controller sends each of the LSB and MSB pages separately, and therefore needs to wait 15 micro-seconds after sending a LSB page and before starting to send the MSB page to the same device. In the present example, sending a pair of pages takes 2·200+15=415 micro-seconds.

As seen in the diagram, although programming the LSB page takes 350 micro-seconds, the device's buffer becomes ready for receiving subsequent data after only 15 micro-seconds and the memory device can start programming the MSB page immediately after programming the LSB page. In other words, there is no gap between the PL and PM periods in this example.

To evaluate idle programming period 70, we calculate a difference between two periods as described herein. The first period includes four I/O periods of sending LSB+MSB pairs and one I/O period of sending a LSB page, i.e., (4·415+200)=1860 micro-seconds. The second period includes an LSB I/O period, a LSB programming period and a MSB programming period, i.e., (200+350+1250)=1800 micro-seconds. Idle programming period 70 therefore equals 1860−1800=60 micro-seconds.

The writing cycle in the LSB+MSB writing scheme, includes an I/O period, a PL period and a PM period, which sum up to 1660 micro-seconds. The efficiency in this scheme is therefore given by (1−60/1660) or approximately 96%. The LSB+MSB scheme thus presents a significant improvement over the reference scheme in which the writing cycle is 2100 micro-seconds and the efficiency is about 76%, as described above. In accordance with the inefficiency measure described above, the inefficiency of this method is given by (1660/1600−1) or about 4%, which is much better than the 31% inefficiency calculated for the reference scheme described above.

Figure 3:
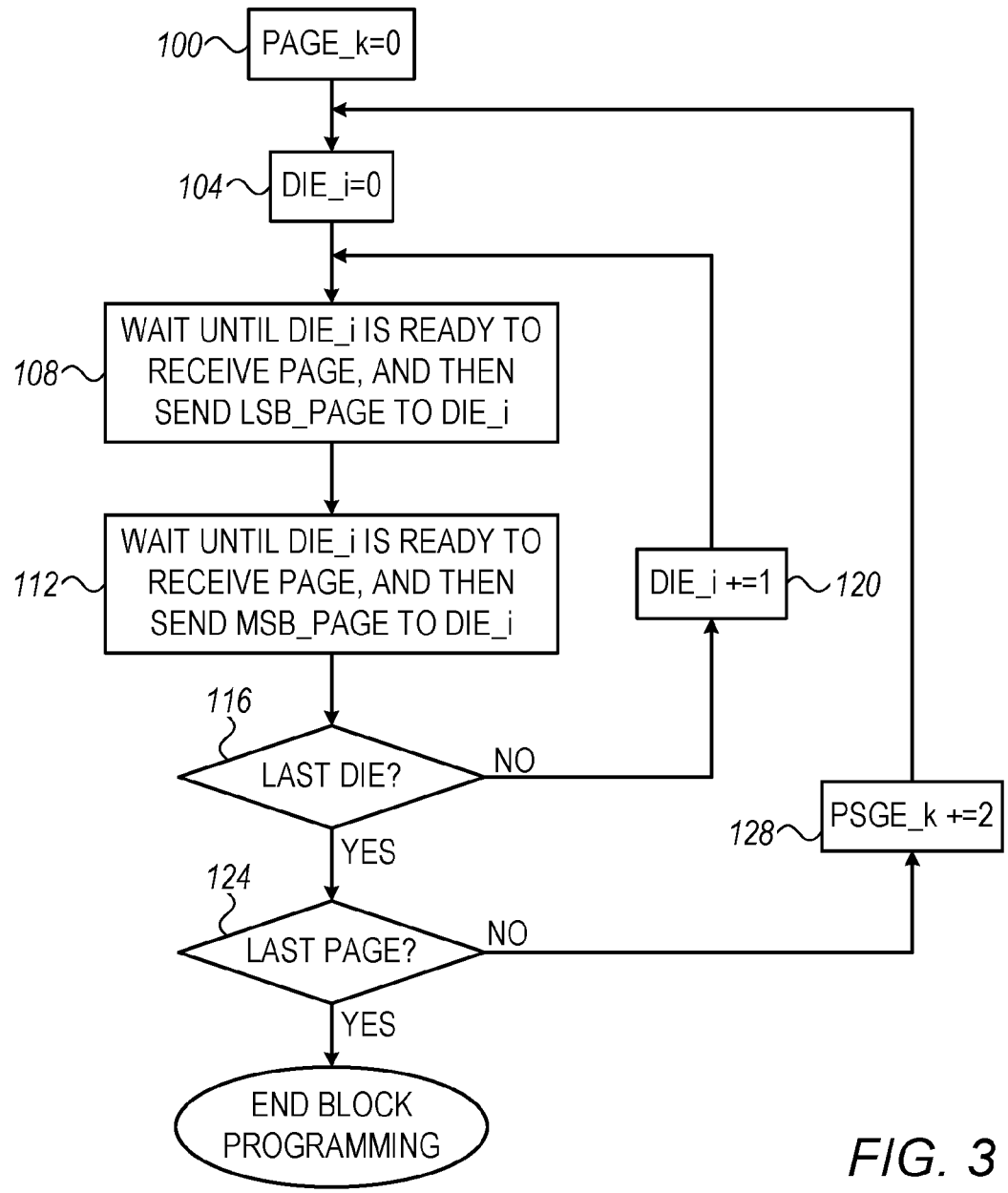
FIG. 3 is a flow chart that schematically illustrates a method for writing pairs of Least-Significant Bit (LSB) and Most-Significant Bit (MSB) pages to multiple memory devices, in accordance with an embodiment that is described herein.

FIG. 3 is a flow chart that schematically illustrates a method for writing pairs of Least-Significant Bit (LSB) and Most-significant bit (MSB) pages to multiple memory devices, in accordance with an embodiment that is described herein. The method of FIG. 3 implements the LSB+MSB writing scheme described in FIG. 2, and is executed by processor 44 of controller 32.

The method begins with the processor clearing a page counter PAGE_k at a page counter initialization step 100. At a die counter initialization step 104, the processor additionally clears a counter DIE_i. The processor then writes a pair of pages to each of the dies as described herein. At a LSB writing step 108, the processor verifies that the current die DIE_i is ready to receive data. The processor waits until the memory device is ready and then writes to the device an LSB page over link 46.

The processor can use any suitable method to verify that the device is ready to receive data. In some embodiments, the processor monitors a cache-busy control line of the memory device and waits until the device indicates that its buffer is allowed to be overwritten, e.g., by changing the voltage level or the logical state of the cache-busy line. The cache-busy line may be part of link 46 or alternatively be a dedicated control line. In other embodiments, the processor requests a ready indication from the memory device, and waits until the device responds by sending such a ready indication over link 46. In yet other embodiments, the controller polls a dedicated status register in the die to detect when the die is ready to accept subsequent data.

At a MSB page writing step 112, the processor waits until memory device DIE_i is ready to receive another page, and then sends to the memory device a MSB page over link 46. At a die loop step 116, the processor checks whether the last die has been written, and if not, the processor increments the die counter at a die counter incrementing step 120, and loops back to step 108. If at step 116, the processor finds that the last die has been written, the processor checks whether the last page has been written, at a page loop step 124. If at step 124 the processor finds that there are additional pages to be written, the processor increments PAGE_k by two, at a page counter advancing step 128, and loops back to step 104. Otherwise, all the pages have been written, and the method terminates.

Improving Writing Throughput by Adding Artificial Idle Delay

In some embodiments, the page programming time varies from one memory device to another, and possibly among different groups of cells within a given device. For example, the nominal 350 micro-seconds of LSB programming time may vary between 300 and 400 micro-seconds. Similarly, the nominal 1250 micro-seconds of MSB programming time may vary, for example, within the range 1200 to 1300 micro-seconds.

Consider an opportunistic writing scheme in which the processor sends a page to the die whose buffer becomes ready first. For example, the processor starts by writing a LSB page to each of the dies, and then writes an MSB page to each of the dies in accordance with the order in which the dies become ready to receive subsequent data.

Having different programming times among and within the memory devices may result in inefficient writing patterns that contain longer than necessary idle periods. The authors have demonstrated, using computer simulations, that artificially increasing the communication idle time by a random delay assists in resolving inefficient writing patterns and improves the writing throughput. In an embodiment, at least some of random delays added are sufficiently long to change the selection order among the memory devices.

Figure 4:
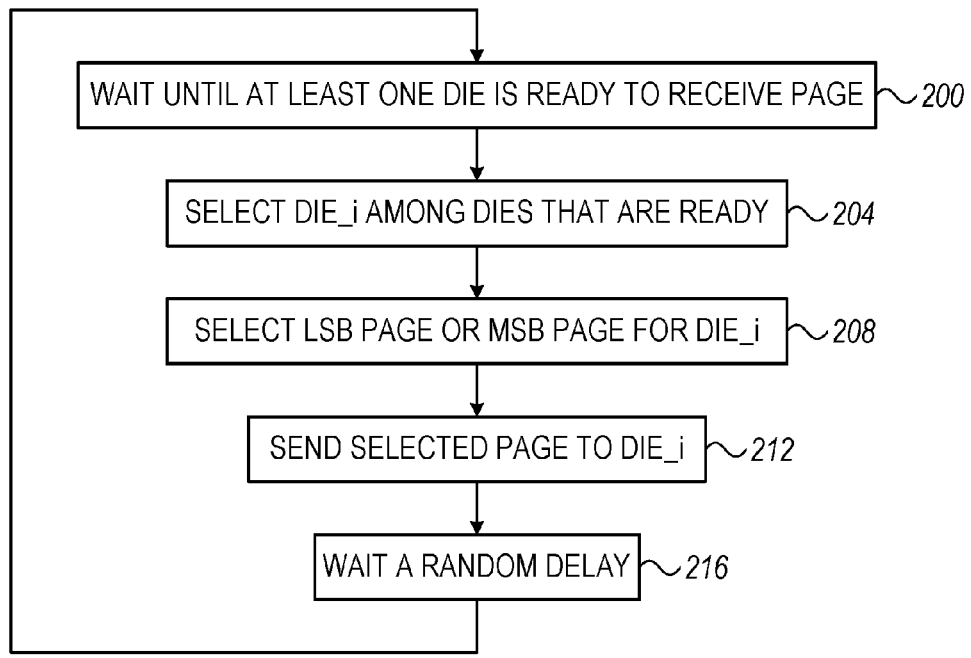
FIG. 4 is a flow chart that schematically illustrates a method for scheduling writing commands to multiple memory devices by adding artificial delay, in accordance with an embodiment that is described herein.

FIG. 4 is a flow chart that schematically illustrates a method for scheduling writing commands to multiple memory devices by adding artificial delay, in accordance with an embodiment that is described herein.

The method begins with the processor waiting until there is at least one die that is ready to receive data, at a waiting step 200. To identify a device that is ready to receive data, the processor may, for example, monitor a cache-busy control line of the device as described above, or use any other suitable method.

At a die selection step 204, the processor selects a die denoted DIE_i, from among the dies identified as ready at step 200. The processor may apply any suitable selection method such as, for example, selecting a die that was written most recently. At a page selection step 208, the controller selects a LSB page or a MSB page to be sent to the die selected at step 204. The processor may select a page using any suitable method. In some embodiments, the controller selects the LSB or MSB pages so that a given die receives an alternating sequence of LSB and MSB pages. At a writing step 212, the processor sends the page selected at step 208 to DIE_i over link 46. The processor then waits a random time delay at a random delay step 216, and loops back to step 200 to wait for one or more of the dies to become ready for receiving subsequent data.

At step 216 above, the processor may determine the random delay using any suitable method. For example, the processor may generate a random value using a pseudo-random number generator and use the random number for counting the delay. Alternatively, the processor waits a random delay in accordance with some natural phenomenon such as, for example, the controller environment temperature. In some embodiments, step 216 is applied selectively.

For example, in an embodiment, the processor waits a random delay only if the page recently sent is of a given type, e.g., an MSB page.

The processor continues executing the loop of FIG. 4 until all the required pages have been written to the respective memory devices, and the method then terminates.

Figure 5:
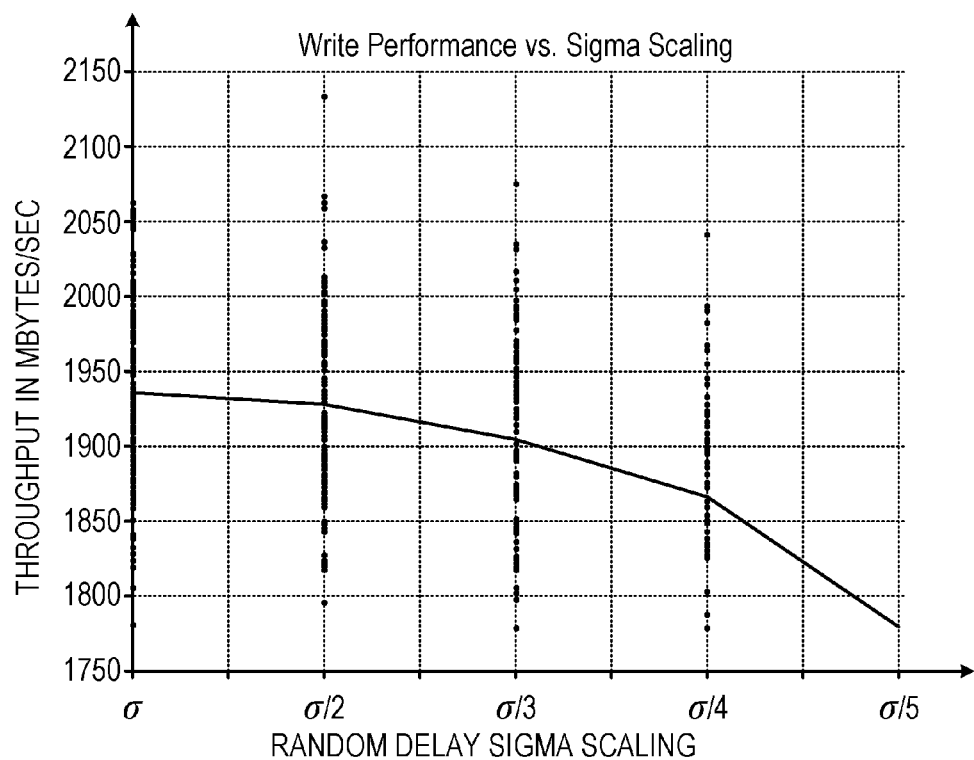
FIG. 5 is a graph that schematically illustrates a relationship between writing throughput and random idle delay added to write commands, in accordance with an embodiment that is described herein.

FIG. 5 is a graph that schematically illustrates a relationship between writing throughput and random idle delay added to write commands, in accordance with an embodiment that is described herein. The artificial delay is added, for example, as described in the method of FIG. 4 above. The graph is based on computer simulations conducted assuming a four-die system.

The horizontal axis describes scaled standard-deviation values of the programming times, wherein σ in the figure equals 50 micro-seconds. Points further to the right thus refer to programming times having lower variability. In the present simulation, the initial non-delayed programming times (separately for LSB and MSB programming) are assumed equal within and across dies. The graph demonstrates that by adding idle delays, the writing throughput may improve.

The embodiments described above are given by way of example, and other suitable embodiments can also be used. For example, although the embodiments above refer mainly to four MLC devices that store 2 bits/cell, the disclosed techniques are equally applicable to a number of memory devices other than four and/or devices that store more than 2 bits/cell. In addition, the numerical time periods given above (i.e., the LSB/MSB programming and cache-busy periods and the I/O period) are used for demonstration purposes only and not as a limiting example. The disclosed techniques are thus applicable with other suitable time periods as well.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A controller, comprising:
   an interface, which is configured to communicate with multiple memory devices over a link; and
   a processor, which is configured to:
      select at least first and second memory devices for writing;
      write in sequence, at least first and second memory pages having different respective first and second bit-significances, to the first memory device over the link, while avoiding writing to any of the other memory devices until writing of all of the at least first and second memory pages over the link has been completed;
      only after verifying that the writing of the all of the at least first and second memory pages over the link has completed, write in sequence, at least third and fourth memory pages of the respective first and second bit-significances, to the second memory device;
      wait until the first memory device is ready to receive subsequent data; and
      in response to verifying that the first memory device is ready to receive subsequent data, write in sequence, to the first memory device, at least fifth and sixth memory pages of the respective first and second bit-significances.

2. The controller according to claim 1, wherein the processor is configured to verify that the first memory device is ready to accept data after completing writing the first memory page over the link and before writing the second memory page over the link.

3. The controller according to claim 1, wherein the processor is configured to write each of the first, second, fifth and sixth memory pages to a same block within the first memory device.

4. The controller according to claim 1, wherein the processor is configured to select the at least first and second memory devices in accordance with a predefined cyclic order.

5. A method, comprising:
   in a controller that connects to multiple memory devices via a link, selecting at least first and second memory devices for writing;
   writing in sequence, by the controller, at least first and second memory pages having different respective first and second bit-significances, to the first memory device over the link, while avoiding writing to any of the other memory devices until writing of all of the at least first and second memory pages over the link has been completed;
   only after verifying that the writing of the all of the at least first and second memory pages over the link has completed, writing in sequence, at least third and fourth memory pages of the respective first and second bit-significances, to the second memory device;
   waiting until the first memory device is ready to receive subsequent data; and
   in response to verifying that the first memory device is ready to receive subsequent data, writing in sequence, to the first memory device, at least fifth and sixth memory pages of the respective first and second bit-significances.

6. The method according to claim 5, wherein writing the at least first and second memory pages comprises verifying that the first memory device is ready to accept data after completing writing the first memory page over the link and before writing the second memory page over the link.

7. The method according to claim 5, wherein writing the first, second, third and fourth memory pages comprises writing each of the first, second fifth and sixth memory pages to a same block within the first memory device.

8. The method according to claim 5, wherein selecting the at least first and second memory devices comprises selecting the at least first and second memory devices in accordance with a predefined cyclic order.

9. A controller, comprising:
   an interface, which is configured to communicate with multiple memory devices over a link; and
   a processor, which is configured to:
      identify one or more of the memory devices that are ready to receive data;
      select a memory device from among the identified memory devices; and generate a random delay and write a memory page to the selected memory device over the link after waiting the random delay during which the controller does not write to any of the memory devices.

10. The controller according to claim 9, wherein the processor is configured to write multiple memory pages of different respective bit-significances in consecutive write commands to the selected memory device.

11. The controller according to claim 9, wherein, by waiting the random delay, the processor is configured to change a selection order among the memory devices.

12. The controller according to claim 9, wherein the processor is configured to generate a random value using a pseudo-random number generator, and to wait a time delay based on the random value.

13. The controller according to claim 9, wherein the processor is configured to generate the random delay and write the memory page to the selected memory device, after waiting the generated delay, even when the selected memory device is available to receive data.

14. A method, comprising:
in a memory controller that connects to multiple memory devices via a link, identifying one or more of the memory devices that are ready to receive data;
selecting, by the memory controller, a memory device from among the identified memory devices;
generating, by a processor, a random delay; and
writing a memory page to the selected memory device over the link after waiting the random delay during which the memory controller does not write to any of the memory devices.

15. The method according to claim 14, and comprising writing multiple memory pages of different respective bit-significances in consecutive write commands to the selected memory device.

16. The method according to claim 14, wherein waiting the random delay comprises changing a selection order among the memory devices.

17. The method according to claim 14, wherein generating the random delay comprises generating a random value using a pseudo-random number generator, and waiting a time delay based on the random value.

18. The method according to claim 14, wherein writing the memory page to the selected memory device over the link after waiting the random delay comprises writing the memory page after waiting the random delay, even when the selected memory device is available to receive data.

* * * * *